United States Patent
Strinati

(10) Patent No.: US 8,630,675 B2
(45) Date of Patent: Jan. 14, 2014

(54) METHOD FOR CONTROLLING POWER IN A CELLULAR NETWORK WITH A SURPLUS OF TRANSMISSION RESOURCES

(75) Inventor: Emilio Calvanese Strinati, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 468 days.

(21) Appl. No.: 12/957,053

(22) Filed: Nov. 30, 2010

(65) Prior Publication Data

US 2011/0136527 A1    Jun. 9, 2011

(30) Foreign Application Priority Data

Nov. 30, 2009    (FR) ...................................... 09 58485

(51) Int. Cl.
*H04B 7/00*    (2006.01)

(52) U.S. Cl.
USPC ............... 455/522; 455/69; 455/70; 455/450; 455/451; 455/452.1; 370/315; 370/316; 370/317; 370/318; 370/319

(58) Field of Classification Search
USPC .................... 455/450–455, 522, 69–70, 13.4; 370/315–320
See application file for complete search history.

(56) References Cited

U.S. PATENT DOCUMENTS

2010/0002575 A1* 1/2010 Eichinger et al. ............. 370/210
2012/0140698 A1* 6/2012 Noh et al. ..................... 370/315

OTHER PUBLICATIONS

Femto Forum—About femtocells; printed from http:www.femtoforum.org/fem2/about-femtocells.php?id=207; accessed on Jun. 28, 2011.
Riato et al., entitled "Interference mitigation strategies for WiMAX networks", ICWCS 2007, 4th International Symposium on Wireless Communication Systems, Oct. 17-19, 2007.

* cited by examiner

*Primary Examiner* — Fayyaz Alam
(74) *Attorney, Agent, or Firm* — Knobbe Martens Olson & Bear LLP

(57) ABSTRACT

A method for controlling the transmission power of a terminal in a cellular telecommunications network, in which the number of transmission resources is greater than the number of users is disclosed. In one aspect, the number of additional transmission resources necessary for the communication of the user if a modulation and coding scheme with minimal spectral efficiency is used, and whether these resources are available, are determined, they are allocated to the user, and the transmission power of the terminal is set to the transmission power enabling the required quality of service to be obtained by using the predetermined modulation and coding scheme.

12 Claims, 2 Drawing Sheets

METHOD FOR CONTROLLING POWER IN A CELLULAR NETWORK WITH A SURPLUS OF TRANSMISSION RESOURCES

CROSS-REFERENCE TO RELATED APPLICATIONS

This application claims the benefit of French Patent Application No. 0958485 filed on Nov. 30, 2010, the contents of which are incorporated herein by reference in their entirety.

TECHNICAL FIELD

This invention relates in general to the field of cellular telecommunications networks and more specifically to a method for controlling transmission power of a terminal in such a network.

PRIOR ART

One of the main problems affecting cellular networks is that of the interference between neighboring cells (inter-cell interference) and/or interference within a single cell (intra-cell interference). Thus, downward or upward communication between a base station and a terminal, generally having one or more processors and memories, of a cell can disrupt communication in an adjacent cell, or, when the cell is partitioned into sectors, in an adjacent sector. This situation is further aggravated by the superimposition of different cellular communication systems, in particular with different operators and of different types, such as 3GPP, Wi-Max, wireless local networks, femtocells. By femtocell, we mean a small base station for residential use, intended to support several high-speed Internet connections, independently of the technology used: CDMA, GSM or UMTS. A description of femtocells can in particular be found at the url http:www-.femtoforum.org.

We will use the term inter-system below to refer to the interference generated by communications of a cellular telecommunications system on another cellular telecommunications system.

Numerous techniques have been developed to deal with inter- or intra-cellular interference. For example, it is well known to allocate, to this end, transmission resources orthogonal to different users of a neighboring cell or cells. These transmission resources can be frequencies, time transmission intervals or TTI, sub-carrier intervals (chunks) in an OFDM multiplex (orthogonal frequency division multiplexing), orthogonal codes, beams separated spatially (by means of directional antennas), or any combination of these resources. Thus, communications relating to different users can be separated in time and/or in space and/or in a code space.

The allocation of transmission resources can be static or dynamic. In the case of static allocation, the resources are allocated for the entire duration of the communication, whereas in the case of dynamic allocation, the allocation is performed according to the instantaneous state of communications in the cell.

Regardless of the type of allocation, the number of orthogonal resources is often insufficient to guarantee a low level of interference between users.

It is also possible to reduce the level of interference between users by means of an adaptive power control. This technique is used in particular for CDMA systems in which the so-called "near-far effect" phenomenon significantly adversely affects performance for low-power users. In general, power control consists of allocating different transmission powers to the different users so as to minimize the level of mutual interference while guaranteeing quality of service to each, described for example in terms of signal-to-noise and interference ratio. When the power control does not make it possible to ensure the quality of service levels required for different communications, additional measures can be taken, such as, for example, control of admission of new users. A description of various methods for reducing interference, in particular by power control, can be found in the article of N. Riato et al., entitled "Interference mitigation strategies for WiMAX networks", ICWCS 2007.

Most power control methods are based on the principle that transmission resources are limited, and generally in an insufficient number with respect to the number of communications, i.e. the number of active users in the network. The classic method for reducing interference by power control is not therefore suitable for a femtocell, in which it is known that the transmission resources (transmission time intervals and sub-carrier intervals of an OFDM multiplex) are overabundant with respect to the number of communications to be established.

The problem underlying the invention is therefore that of providing a method for controlling power in a cellular network, that is simple and robust and that can lead to a significant reduction in the interference level when the number of transmission resources is higher than the number of communications.

DESCRIPTION OF THE INVENTION

This invention is defined by a method for controlling the transmission power of a terminal in a cellular telecommunications network, in which at least one transmission resource and a modulation and coding scheme are initially allocated to said terminal for transmission with a quality of service required for a link, in which:

the number of additional transmission resources that would be necessary for the transmission by means of a predetermined modulation and coding scheme, with a lower spectral efficiency than the modulation and coding scheme initially allocated, is determined;

it is checked whether the number of transmission resources available in the zone where the terminal is located is greater than the number of additional transmission resources thus determined, and, in the affirmative, the additional transmission resources are allocated to said terminal, and the transmission power thereof is set to the minimum transmission power enabling the quality of service required to be obtained by using the predetermined modulation and coding scheme.

According to a first variant, the predetermined modulation and coding scheme is identical for all of the terminals belonging to the same zone.

According to a second variant, the predetermined modulation and coding scheme is dependent on a characteristic of the communication of the terminal.

According to a third variant, the predetermined modulation and coding scheme is set when the terminal is admitted into a zone of said network.

Advantageously, the predetermined modulation and coding scheme can be dependent on the number of transmission resources available in said zone when the power control is performed.

The allocation of the resources to the various terminals located in the zone can be performed periodically, and, in this case, the power control of these terminals is repeated in each allocation period.

According to a first embodiment, the number of transmission resources available in the zone where the terminal is located is less than the number of additional transmission resources, and the predetermined modulation and coding scheme, called the first scheme, is replaced by a second modulation and coding scheme, called the second scheme, with a higher spectral efficiency than the first scheme.

According to a second embodiment, the predetermined modulation and coding scheme is decided between neighboring zones of the network, in particular between base stations serving neighboring cells or adjacent cell sectors.

According to a third embodiment, the predetermined modulation and coding scheme is set by a telecommunications network separate from said cellular telecommunications network.

The transmission resources are, for example, sub-carrier intervals of an OFDM multiplex.

In this case, the transmission power of the terminal can be set by:

$$P'_e(dB) = P_e(dB) + SNR'_{Th}(dB) - SNR_{Th}(dB)$$

in which $P_e$ is the power initially allocated to the terminal, $SNR'_{th}$ and $SNR_{th}$ are the signal-to-noise ratios necessary for obtaining said required quality of service, by respectively using the predetermined modulation and coding scheme and the modulation and coding scheme initially allocated to said terminal.

Alternatively in this case again, the transmission power of the terminal is set by:

$$P'_e = \frac{N_0}{|h|^2} SNR'_{Th}$$

in which h is the attenuation coefficient on said link and $N_0$ is an estimation of the noise power on this link.

BRIEF DESCRIPTION OF THE DRAWINGS

Other features and advantages of the invention will appear in view of the preferred embodiment of the invention described in reference to the appended figures, in which.

DETAILED DESCRIPTION OF SPECIFIC EMBODIMENTS

Figure 1:
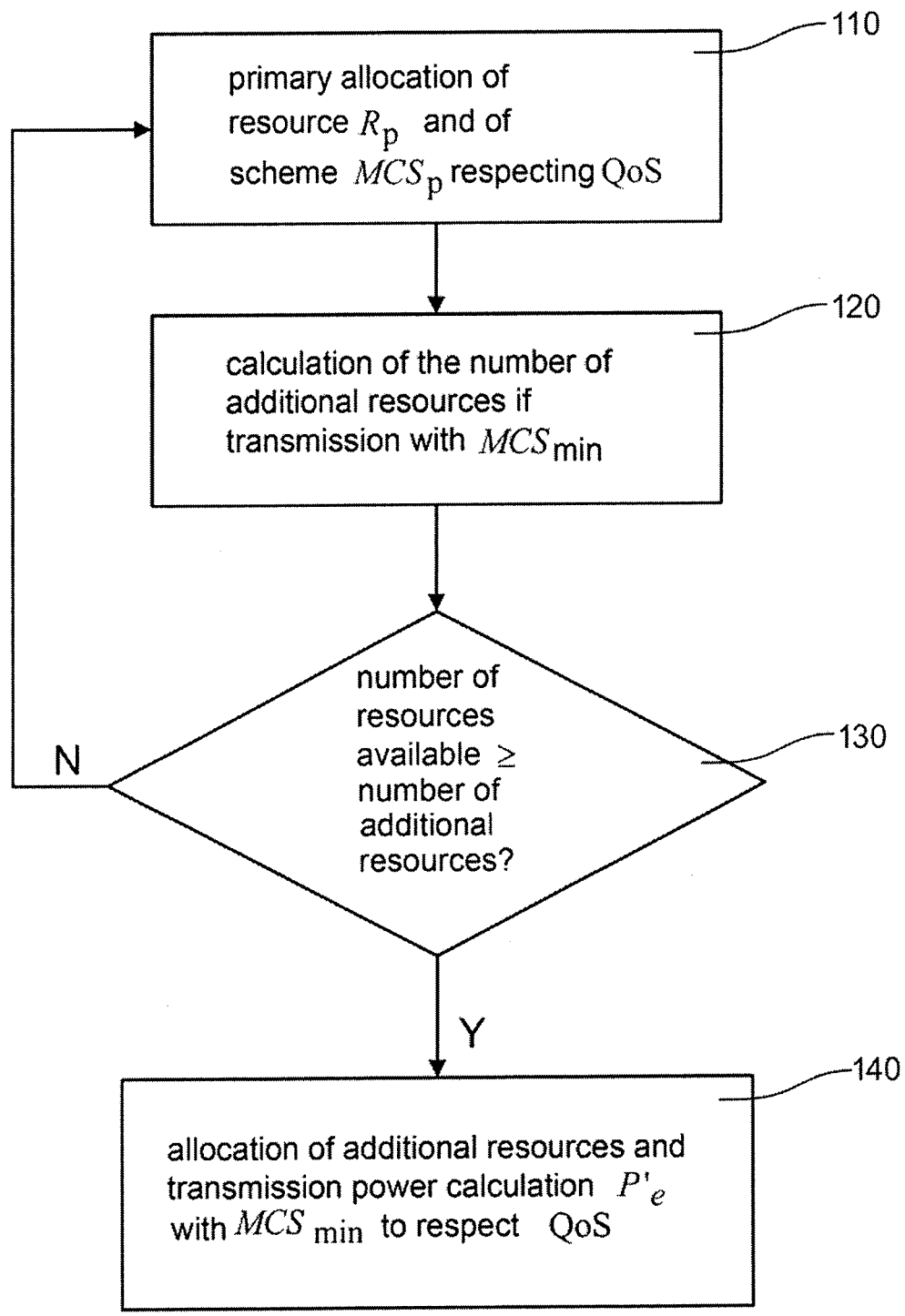
FIG. 1 diagrammatically shows a method for controlling power in a cellular network according to an embodiment of the invention.

We will consider below a cellular network and more specifically a cell of such a network, or a sector of such a cell. The general term zone will be used to refer both to a cell and to a sector of a cell.

We will assume below that the network has orthogonal or quasi-orthogonal transmission resources for separating the communications of users. By transmission resources, we mean separate frequencies, separate transmission times, separate sub-carrier intervals of an OFDM multiplex, orthogonal codes or any combination of the aforementioned resources. It is also assumed that the number of transmission resources is on average higher than the number of users to be served in the zone.

The uplink or downlink of a user is characterized by the modulation and coding scheme that it uses. By modulation and coding scheme or MCS, we mean a pair consisting of a channel code and a modulation alphabet. More specifically, the link of a user may use error correction codes or FEC (forward error correction) having different coding rates and modulation alphabets having different degrees of modulation. Thus, in general, the lower the rate of the code and the degree of modulation are, the lower the spectral efficiency of the link will be, but the higher its noise robustness will be. Conversely, the higher the code rate and the degree of modulation are, the higher the spectral efficiency of the link will be but the lower its noise robustness will be. It is noted that the spectral efficiency of a link is expressed in bits/s/Hz.

For illustrative purposes, we have provided in table I below examples of modulation and coding schemes for a downward OFDM link ensuring voice traffic in an LTE (long term evolution) system in an "indoor" context.

TABLE I

| MCS reference | Modulation alphabet | Code rate | Spectral efficiency | $SNR_{th}$ (dB) |
|---|---|---|---|---|
| MCS1 | QPSK | 1/3 | 2/3 | −1.31 |
| MCS2 | QPSK | 1/2 | 1 | 1.07 |
| MCS3 | QPSK | 2/3 | 4/3 | 3.20 |
| MCS4 | 16-QAM | 1/3 | 4/3 | 3.48 |
| MCS5 | QPSK | 3/4 | 3/2 | 4.33 |
| MCS6 | 16-QAM | 1/2 | 2 | 6.37 |
| MCS7 | 64-QAM | 1/3 | 2 | 7.30 |
| MCS8 | 16-QAM | 2/3 | 8/3 | 9.05 |
| MCS9 | 16-QAM | 3/4 | 3 | 10.38 |
| MCS10 | 64-QAM | 3 | 3 | 11.03 |
| MCS11 | 64-QAM | 4 | 4 | 14.02 |
| MCS12 | 64-QAM | 9/2 | 9/2 | 15.60 |

It is noted that a spectral efficiency η corresponds to each modulation and coding scheme MCS. In addition, for a given quality of service to be achieved (QoS), expressed for example as an bit error rate or a packet error rate not to be exceeded, the use of an MCS scheme requires the signal-to-noise level on the link to be higher than a minimum level, $SNR_{th}$. The $SNR_{th}$ values are specific to a type of implementation, and are generally dependent on the environment of the network, the code used, etc. They are determined experimentally or heuristically.

A person skilled in the art will understand that, in order to obtain a given quality of service, only certain modulation and coding schemes $MCS_n$, $n \leq n_0$ can be used. Thus, in the table above, if the signal-to-noise ratio of the link is 7 dB, only schemes $MCS_n$, n=1, . . . , 6 are suitable. In addition, the number of transmission resources to be used is dependent on the MCS scheme used. For example, the $MCS_6$ scheme has a spectral efficiency twice that of the $MCS_2$ scheme, and can therefore use half the transmission resources (in this case, sub-carrier intervals of the OFDM multiplex).

By link adaptation control, we mean the operation that assigns to the link of a user a modulation and coding scheme enabling a given quality of service to be obtained on this link. Traditionally, the link adaptation control selects the MCS scheme offering the greatest possible spectral efficiency and therefore enabling the use of the lower number of transmission resources.

The idea underlying the invention takes the converse of this usual strategy and proposes reducing the spectral efficiency on a link by allocating, in correlation, a higher number of transmission resources. This makes it possible, with a constant quality of service, to reduce the transmission power on each transmission resource and thus the interference level generated, whether on communications of the same sector, the same cell, neighboring sectors or adjacent cells, or on communications of another cellular system. In particular, when a plurality of cellular networks are superimposed, with macrocells, cells or femtocells, the reduction in the transmission level in one of them enables the inter-system interference level to be reduced.

FIG. 1 diagrammatically shows the flow chart of a method for controlling power according to an embodiment of the invention.

It is assumed that an allocation of transmission resources and a link adaptation control have previously been performed for each user.

Each user is thus allocated at least one transmission resource and one modulation and coding scheme, denoted $MCS_p$, for transmitting on this resource, with a required quality of service, QoS. The result of this allocation is shown in 110.

Below, a communication on an upward link of a user or a downward link for a given user is considered.

In a first step 120, it is determined the number of additional transmission resources that would be required for the transmission by means of a predetermined modulation and coding scheme, $MCS_{min}$, having a predetermined minimum spectral efficiency. If the modulation and coding schemes are ordered by increasing spectral efficiency, $MCS_1, \ldots, MCS_p, \ldots, MCS_N$, the predetermined scheme belongs in general to $MCS_1, \ldots, MCS_p$. If, exceptionally, the scheme initially allocated, $MCS_{n0}$, has the same spectral efficiency or a spectral efficiency lower than that of $MCS_{min}$, no reallocation takes place and it goes to the next user.

In a second step 130, it is determined whether the number of transmission resources available in the zone (cell, sector) where the terminal is located is greater than the number of additional transmission resources thus determined. If not, according to a first variant, one goes back to 110 by keeping the initial resource allocation and MCS scheme, and one goes on to the next user. According to a second variant not shown, a new scheme $MCS_{min}$ is used, with a higher spectral efficiency than the initial scheme (for example, the next scheme in the list of MCS schemes ordered by increasing spectral efficiency as in table I) and one goes back to step 120. Advantageously, in this case, the $MCS_{min}$ scheme is reset to the initial scheme each time one goes to a new user.

In step 140, if the additional resources are actually available in the zone considered, the additional transmission resources are allocated to said terminal and its transmission power is set to the lowest transmission power enabling the set point quality of service QoS to be obtained, by using the predetermined modulation and coding scheme, $MCS_{min}$.

The predetermined modulation and coding scheme $MCS_{min}$ can be identical for the different users located in a zone (cell, sector). According to an example embodiment, this scheme can be negotiated beforehand between adjacent sectors and/or neighboring cells, in particular according to their respective loads.

Alternatively, the predetermined scheme $MCS_{min}$ can differ from one user to another according to characteristics of the user, for example according to the quality of service required, the maximum packet size required by the communication, the subscription category of the user, whether the communication is in real time or not, etc.

Also alternatively, the scheme $MCS_{min}$ can be dependent on the user in the sense that it is determined in the admission procedure, in particular on the basis of the number of transmission resources available in the zone considered. For example, when a terminal enters a cell, it can be allocated a $MCS_{min}$ scheme with a higher or lower spectral efficiency according to the instantaneous load of the cell, i.e. according to whether it has few or many free transmission resources at that time.

The power control shown in FIG. 1 can be performed at regular intervals, for example in each resource allocation period, or in interruption mode, each time the transmission resources are released in the zone in question. In both cases, the transmission resources released in the meantime can be allocated to a user in step 140.

Figure 2:
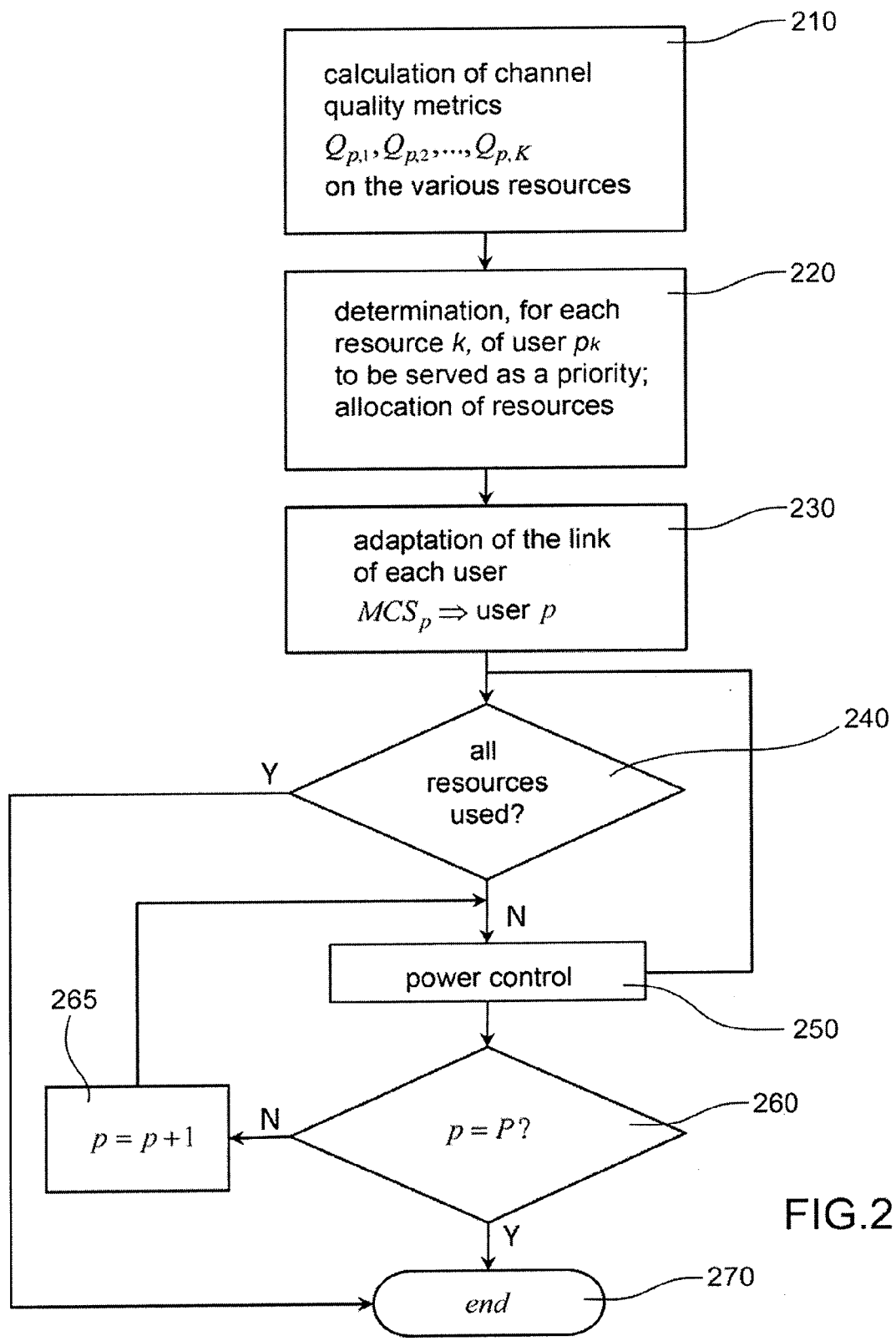
FIG. 2 shows an example of the use of a method for controlling power according to the invention in the context of an OFDMA cellular network.

FIG. 2 diagrammatically shows the power control method, according to an embodiment of the invention, in the specific case of an OFDMA (orthogonal frequency division multiple access) system. The transmission resources are sub-carrier intervals of an OFDM multiplex and the allocation of resources is performed at regular intervals. Let $T_a$ be the allocation period of these resources.

A zone of the network (cell, cell sector) is considered, including P active users, denoted $UE_1, \ldots, UE_P$. The transmission resources are denoted $chunk_1, \ldots, chunk_K$, and define a frequency partition of the OFDM multiplex. In each period $T_a$, a user can be allocated one or more resources among the K possible resources.

In step 210, for each user p, the value of a channel quality metrics on each of the transmissions resources $chunk_1, \ldots, chunk_K$ is calculated. Thus, metric values $Q_{p,1}, \ldots, Q_{p,K}$ are obtained, with each value $Q_{p,k}$ giving an indication of the quality of the channel of the user p on the resource $chunk_k$. This metric can be, for example, a signal-to-noise ratio, a signal-to-noise and interference ratio or an attenuation coefficient.

In step 220, for each of the resources $chunk_k$, the user $UE_{p_k}$ who will be served in priority is selected according to a utility function or a scheduling rule.

In the first case, it involves maximizing a utility function (or, in an equivalent manner, minimizing a cost function), for example maximizing the channel quality metric on the resource, i.e.:

$$p_k = \operatorname*{Argmax}_{p}(Q_{p,k}) \quad (1)$$

In the second case, it involves enabling access to the resource according to an urgency or fairness criterion. For example an EDF (earliest deadline first), PF (proportional fair) or round-robin algorithm can be used as scheduling rule.

Depending on the particular case, it may be possible to apply both a utility function and a scheduling rule in order to select the priority user for each resource. This selection mode makes it possible to split up users who could not be on the basis of the maximization of said utility function alone or the application of the scheduling rule alone.

At the end of step 220, each user p is allocated the resources:

$$chunk_k | p_k = p \quad (2)$$

in other words, the link of user p will use the resources that have thus been allocated thereto.

In step 230, an adaptation of the link of each user $U_p$ will be performed according to quality of service required $QoS_p$ for the communication. It is noted that the quality of service can be worded as the bit error rate (BER) or the packet error rate (PER). The adaptation of the link consists of choosing a modulation and coding scheme from a set of possible schemes $MCS_1, \ldots, MCS_N$ making it possible to obtain the best spectral efficiency on the link while complying with the set point $QoS_p$.

At the end of step 230, each user p is thus allocated a modulation and coding scheme $MCS_p$.

In 240, it is checked whether all of the transmission resources of the zone are used. If so, the process is ended in 270. If not, an iteration loop on p symbolized by 250 is begun, in which a power control for each of the users is performed, as explained in reference to FIG. 1.

It is verified at the end of each iteration that the total number of transmission resources of the zone has been reached, and, if so, the process is ended in 270. Indeed, the power control method according to the invention assumes that transmission resources are free. It can only mobilize them and not release them.

In 260, a test is conducted to determine whether all of the users have been processed, i.e. whether p=P. If so, the process is ended in 270. If not, p is incremented in 265 and a power control is performed for the next user.

For a user $UE_p$ with a required quality of service $QoS_p$ to which at least one transmission resource $chunk_k$ and a modulation and coding scheme $MCS_p$ have been allocated, the number of additional resources $chunk_{k'}$, k'≠k that would be necessary to allocate to the user in order to be capable of transmitting with the modulation and coding scheme $MCS_{min}$, is determined. For example, if m sub-carrier intervals (assumed to have the same bandwidth) are initially allocated to the user, the number of additional sub-carrier intervals can be expressed as:

$$m' - m = \left(\frac{\eta}{\eta_{min}} - 1\right)m \quad (3)$$

in which $\eta$ and $\eta_{min}$ are respectively the spectral efficiency of the $MCS_p$ scheme and that of the $MCS_{min}$ scheme.

If these m'-m resources are available, they are allocated to the user (who would thus have a total of m' resources).

The signal-to-noise ratio necessary for obtaining the quality of service $QoS_p$ with the scheme $MCS_p$ is denoted $SNR_{th}^P$. This signal to noise ratio is given by a table stored in the memory, containing, for example, the information in table I for the quality of service $QoS_p$. It is understood that, for each BER (or PER) level, a minimum signal-to-noise ratio $SNR_{th}$ is associated with each modulation and coding scheme.

Then, by means of the same table, the signal-to-noise ratio $SNR'_{th}^P$ necessary for obtaining the same quality of service $QoS_p$ with the $MCS_{min}$ scheme is determined.

The new transmission power $P'_e$ of the user's terminal can then be obtained on the basis of the transmission power $P_e$ initially allocated to said user, by means of:

$$P'_e (dB) = P_e (dB) + SNR'_{Th}^P (dB) - SNR_{Th}^P (dB) \quad (4)$$

Alternatively, if the attenuation coefficient $h_p$ of the link is known, and the noise power $N_0$ on this link has been estimated, it is not necessary to search the table for the signal-to-noise ratio $SNR_{th}^P$, and the transmission power $P'_e$ can be calculated directly:

$$P'_e = \frac{N_0}{|h_p|^2} SNR'_{Th} \quad (5)$$

As shown in the particular case of an OFDMA system, a person skilled in the art will understand that the power control method according to the invention is not dependent on the type of transmission resources to be allocated. The power control method disclosed in reference to FIG. 1 does not in particular make any assumptions on the type of access and can be applied in principle to any type of cellular network.

It will be understood that other aspects will become readily apparent to those skilled in the art from the descriptions herein. One skilled in the art would understand that the present disclosure, the drawings and the descriptions in the present disclosure are to be regarded as illustrative in nature and not as restrictive.

The description set forth in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The description includes specific details for the purpose of providing a thorough understanding of the present disclosure. However, it will be apparent to those skilled in the art that the present disclosure may be practiced without these specific details.

The description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for controlling a transmission power of a terminal in a cellular telecommunications network, in which at least one transmission resource and a modulation and coding scheme are initially allocated to the terminal for transmission with a quality of service required for a link, comprising:
   determining a number of additional transmission resources that would be necessary for the transmission by means of a predetermined modulation and coding scheme, with a lower spectral efficiency than the modulation and coding scheme initially allocated;
   checking whether a number of transmission resources available in a zone where the terminal is located is greater than the number of additional transmission resources thus determined, and, if so,
   allocating the additional transmission resources to the terminal; and setting the transmission power thereof to a minimum transmission power so as to enable a quality of service required to be obtained by using the predetermined modulation and coding scheme.

2. The power control method according to claim 1, wherein the predetermined modulation and coding scheme is identical for all of the terminals belonging to the same zone.

3. The power control method according to claim 1, wherein the predetermined modulation and coding scheme is dependent on a characteristic of the communication of the terminal.

4. The power control method according to claim 1, wherein the predetermined modulation and coding scheme is set when the terminal is admitted into a zone of the network.

5. The power control method according to one of the previous claims, wherein the predetermined modulation and coding scheme is dependent on the number of transmission resources available in the zone when the power control is performed.

6. The power control method according claim 1, 2, 3 or 4, wherein the allocation of the resources to the various terminals located in the zone can be performed periodically, and the power control of these terminals is repeated in each allocation period.

7. The power control method according to claim 1, wherein if the number of transmission resources available in the zone where the terminal is located is less than the number of additional transmission resources, the predetermined modulation and coding scheme is replaced by a second modulation and coding scheme with a higher spectral efficiency than the predetermined modulation and coding scheme.

8. A power control method according to claim 1, wherein the predetermined modulation and coding scheme is decided between neighboring zones of the network, or wherein the predetermined modulation and coding scheme is decided between base stations serving neighboring cells or adjacent cell sectors.

9. A power control method according to claim 1, wherein the predetermined modulation and coding scheme is set by a telecommunications network separate from the cellular telecommunications network.

10. A power control method according to claim 1, wherein the transmission resources are sub-carrier intervals of an OFDM multiplex.

11. A power control method according to claim 10, wherein the transmission power of the terminal can be set by:

$$P'_e(\text{dB}) = P_e(\text{dB}) + SNR'_{Th}(\text{dB}) - SNR_{Th}(\text{dB})$$

in which $P_e$ is the power initially allocated to the terminal, $SNR'_{th}$ is the signal-to noise ratio necessary for obtaining the required quality of service by using the predetermined modulation and coding scheme, and $SNR_{th}$ is the signal-to-noise ratio necessary for obtaining the required quality of service by using the modulation and coding scheme initially allocated to the terminal.

12. A power control method according to claim 10, wherein the transmission power of the terminal is set by:

$$P'_e = \frac{N_0}{|h|^2} SNR'_{Th}$$

in which h is the attenuation coefficient on the link and $N_0$ is an estimation of the noise power on the link.

* * * * *